US011589360B2

(12) United States Patent
Kong et al.

(10) Patent No.: US 11,589,360 B2
(45) Date of Patent: Feb. 21, 2023

(54) DISTRIBUTED ADAPTIVE BEAMFORMING AND NULLFORMING FOR SECURE WIRELESS COMMUNICATIONS

(71) Applicant: U.S. Army Combat Capabilities Development Command, Army Research Laboratory, Adelphi, MD (US)

(72) Inventors: Justin S. Kong, Clarksville, MD (US); Fikadu T. Dagefu, Silver Spring, MD (US); Brian M. Sadler, Laurel, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 18 days.

(21) Appl. No.: 17/205,355

(22) Filed: Mar. 18, 2021

(65) Prior Publication Data

US 2022/0104204 A1 Mar. 31, 2022

Related U.S. Application Data

(60) Provisional application No. 63/081,653, filed on Sep. 22, 2020.

(51) Int. Cl.
*H04W 72/08* (2009.01)
*H04W 16/28* (2009.01)
*H04W 72/044* (2023.01)

(52) U.S. Cl.
CPC ........... *H04W 72/08* (2013.01); *H04W 16/28* (2013.01); *H04W 72/046* (2013.01)

(58) Field of Classification Search
CPC .............................. H04W 72/08; H04W 16/28
See application file for complete search history.

(56) References Cited

U.S. PATENT DOCUMENTS 7,006,039 B2 2/2006 Miyamoto et al.
2016/0210977 A1* 7/2016 Ghido .................... G10L 19/02
(Continued)

FOREIGN PATENT DOCUMENTS

WO WO 2019/051079 A1 3/2019

OTHER PUBLICATIONS

J. Kong, F. T. Dagefu, and B. M. Sadler, "Simultaneous Beamforming and Nullforming for Covert Wireless Communications," in Proceedings of IEEE Vehicular Technology Conference, May 25-Jul. 31, 2020.

(Continued)

*Primary Examiner* — Anez C Ebrahim
(74) *Attorney, Agent, or Firm* — Eric B. Compton (57) ABSTRACT

A system and method for distributed wireless communications comprising a first group of agents selected and configured to wirelessly transmit a communication signal to a client, wherein the first group of agents is capable of forming a radiation beam carrying the communication signal vectored substantially toward the client, and a second group of agents selected and configured to wirelessly broadcast communication signal interference, wherein the second group of agents is capable of forming a radiation beam not vectored substantially toward the client. Consequently, the first group of agents securely communicates with the client and the second group of agents suppresses the ability of an unauthorized, eavesdropping receiver from intercepting the communications signal.

20 Claims, 5 Drawing Sheets

(56) References Cited

U.S. PATENT DOCUMENTS

2020/0274686 A1* 8/2020 Khude ................. H04W 72/12
2021/0028830 A1* 1/2021 Kim ................. H04W 72/0453

OTHER PUBLICATIONS

R. Mudumbai et al., "Distributed Transmit Beamforming Using Feedback Control", IEEE Transactions on Information Theory, vol. 56, No. 1, Jan. 2010, 16 pgs.

Justin Kong, Fikadu T. Dagefu, and Brian M. Sadler, "Distributed Beamforming in the Presence of Adversaries," IEEE Transactions on Vehicular Technology (Early Access). Jun. 10, 2020.

Justin Kong, Fikadu T. Dagefu, and Brian M. Sadler, "Distributed Adaptive Beamforming and Nullforming for Covert Wireless Communications," presented at the IEEE VTC2019—Fall conference on Sep. 25, 2019. This paper was later published in proceeding of IEEE VTC2019—Fall on Nov. 7, 2019.

* cited by examiner

DISTRIBUTED ADAPTIVE BEAMFORMING AND NULLFORMING FOR SECURE WIRELESS COMMUNICATIONS

RELATED APPLICATION

This application claims benefit to U.S. Provisional Patent Application Ser. No. 63/081,653, filed 22 Sep. 2020 and entitled Distributed Adaptive Beamforming and Nullforming for Secure Wireless Communications," which is hereby incorporated herein in its entirety by reference.

GOVERNMENT INTEREST

The invention described herein may be manufactured, used, and licensed by or for the United States Government. Some research underlying the invention was sponsored in-part by the Army Research Laboratory under Cooperative Agreement Number W911NF-19-2-0101.

BACKGROUND

I. Field

This application relates generally to radio frequency (RF) communications, and more particularly, to systems and methodologies for distributed adaptive beamforming and nullforming for secure wireless communications.

II. Description of Related Art

Unlike well-founded cellular networks, many communications environments are highly dynamic and infrastructure-poor, and hence coordination among transceivers, information about channels between transceivers, and knowledge of potential adversaries using communications intercepting receivers is generally very limited. In addition, potential adversaries use devices that are often passive and conceal their presence, and therefore the legitimate transceivers have no knowledge about the advisory device locations or capabilities. Conventional distributed beamforming methods do not consider security issues or assume that the legitimate users have knowledge about potential adversaries.

Instead, many conventional methods in distributed beamforming networks consider one of two scenarios: (1) maximizing the data rate achieved at a client device (i.e., a legitimate user device) without consideration of potential adversaries, and (2) supporting the client device while alleviating the signals to unintended receivers by utilizing the channel information of the client device and unintended receivers.

These approaches may also result in sidelobes that radiate significant energy to unintended directions. This in turn makes the wireless link vulnerable to eavesdropping and may cause interference at unintended receivers. In an effort to control sidelobe magnitude, transmit power control algorithms have been developed to reduce the peak sidelobe level. Also, a power and phase optimization strategy has been proposed with two objective functions, i.e., peak sidelobe level minimization and directivity maximization. However, these techniques did not take phases of fading channels into account and they were based on the assumption that each agent transmitter has the a priori knowledge of the locations of and directions toward all user transceivers.

SUMMARY

Embodiments of the invention comprise systems and methodologies for beamforming and nullforming to enhance throughput of data to a client device and disrupt the ability of an adversary to use a receiver to intercept the transmission to a client device. Such beamforming and nullforming is performed by a plurality of agent devices transmitting without a priori knowledge of the locations of each of the agent devices, the client device and/or any adversary devices attempting to intercept the transmission to the client device from one or more of the agent devices. The agent devices create a data carrying beam directed at the client device while also producing a null in signal strength of a noise carrying signal that is intended to disrupt reception at adversary locations of the data carrying signal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments, including less effective but also less expensive embodiments which for some applications may be preferred when funds are limited. These embodiments are intended to be included within the following description and protected by the accompanying claims.

DETAILED DESCRIPTION

Due to the increasing presence of adversaries and the threat they pose to both civilian and military communications networks, it is important to utilize sophisticated secure wireless communication techniques to improve data throughput to desired recipients and degrade the possibility of adversarial communication interception.

The following describes beamforming systems and methodologies that create a directional (or vectored) link to a client device (e.g., a communications transceiver) or other entity while enhancing security against potential eavesdropping by communication devices (e.g., receivers) used by adversaries. In order to obfuscate the reception of signals by one or more adversaries without having any information about them or their locations, various embodiments utilize a number of transmitters (agents) to produce interference with the aim of preventing the adversaries from intercepting confidential messages. More specifically, the embodiments divide a plurality of distributed agent devices (i.e., agents transceivers referred herein as agents) into two separate groups. A first agent group is configured to transmit a radio frequency (RF) communication message to a client device (i.e., a client transceiver referred to herein as a client) and/or other agents. A second agent group broadcasts RF signals to interfere with one or more adversary devices (i.e., an adversary receiver referred herein as adversary or adversaries) and creates a null in the interfering signal that points in the direction of the client device. An RF signal is meant to include any radio frequency signal that through the use of multiple transmitters may form a radiation pattern comprising a radiation beam or null, including signals in spectrums such as ULF, UHF, VHF, millimeter wave, microwave, ultrasonic waves, and the like.

Since the first group forms a beam vectored substantially towards the client, these agents are referred to as beamforming agents. Although the RF interference produced by the latter group can obfuscate the adversaries, it may also unfortunately degrade the quality-of-service (QoS) of the client. Therefore, to alleviate the impact of the RF interference at the client, the latter group is configured to create a null substantially vectored towards the client. As such, the agents in the latter group are referred to as the nullforming agents.

Figure 1:
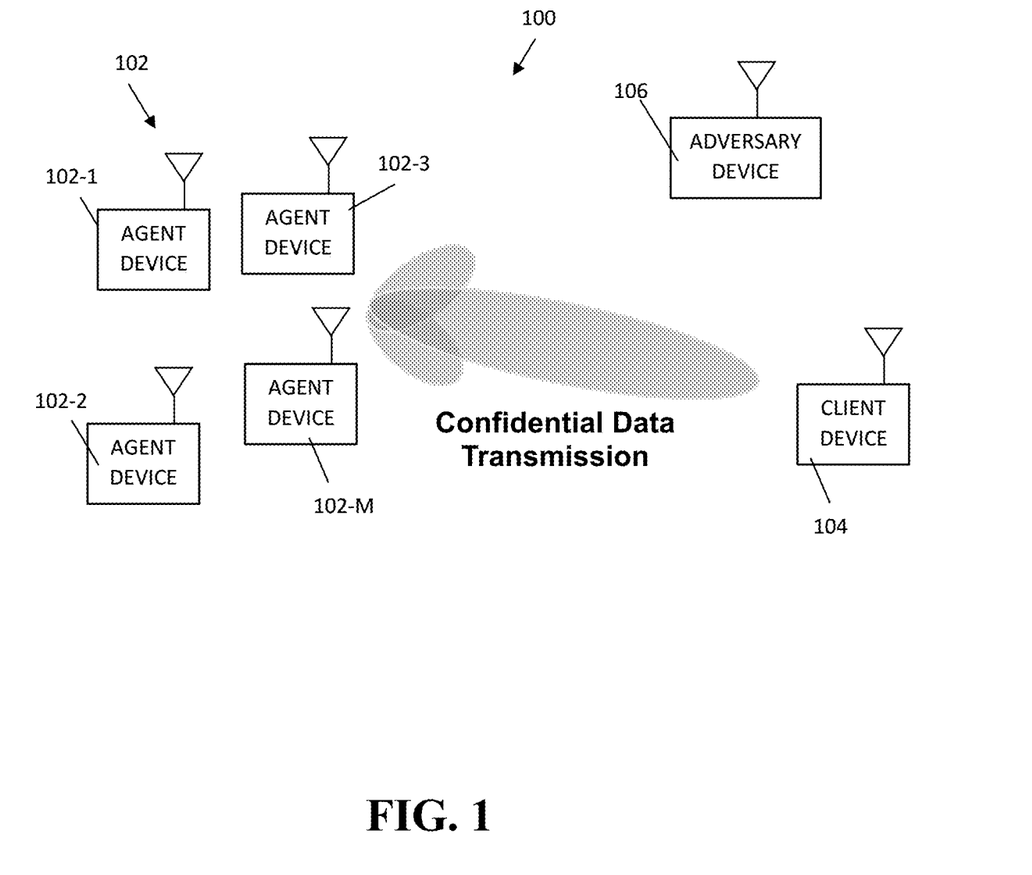
FIG. 1 is a block diagram of a wireless communication network comprised of a plurality of agent devices and at least one client device in accordance with at least one embodiment of the invention.

FIG. 1 is a block diagram of a wireless communication network 100 composed of a plurality of distributed agents 102-1, 102-2, 102-3 . . . 102-M (collectively, agents 102) and at least one client 104 in accordance with at least one embodiment of the invention. The agents 102 and client 104 are geometrically separated from one another in two-dimensional (2D) space, as shown, or it could be three-dimensional (3D) space. In the depicted embodiment, M is, for example, four, but could be as many as needed (no theoretical limit) or as few as two, in other embodiments. The client may be an individual (e.g., a soldier, warfighter, commercial user) equipped with or otherwise using a radio. While one client is depicted, there could be others. Potential adversaries 106 may be located in a position to eavesdrop on RF communications between an agent 102 and the client 104. As mentioned above, potential adversaries 106 often utilize passive receiving devices and conceal their presence. They could be individuals with suitable RF devices or passive RF detectors sensors (also known as RF "sniffers" or "bugs"). Thus, their presence may not be known or detected by the agents 102 or client 104.

In one embodiment, one or more of the agents 102 may be an autonomous vehicle, a mobile command station or an individual carrying a transceiver. While some agents 102 may be ground-based platforms, in other embodiments the agents may be air-borne and/or sea-borne platforms, or any combination of ground-, air- or sea-borne platforms. The agents may be equipped with cameras and microphones for providing image/video data and sound/voice data. Additionally, the agents may be equipped with various sensor(s) for providing other information. Some non-limiting examples of sensors may include: additional or multispectral imaging (UV/visible/IR); antennas (RF; radio); ranging (radar; LIDAR); location/position sensors (GPS, altitude/depth, etc.), motion sensors (speed/velocity, bearing/trajectory, acceleration, etc.); weather sensors (temperature, pressure, wind speed, ambient lighting, etc.); and field sensors (electric, magnetic, vibrations, radiation, biological, etc.). Of course, other sensors and sensor information may also be provided for as may be desirable.

Figure 2:
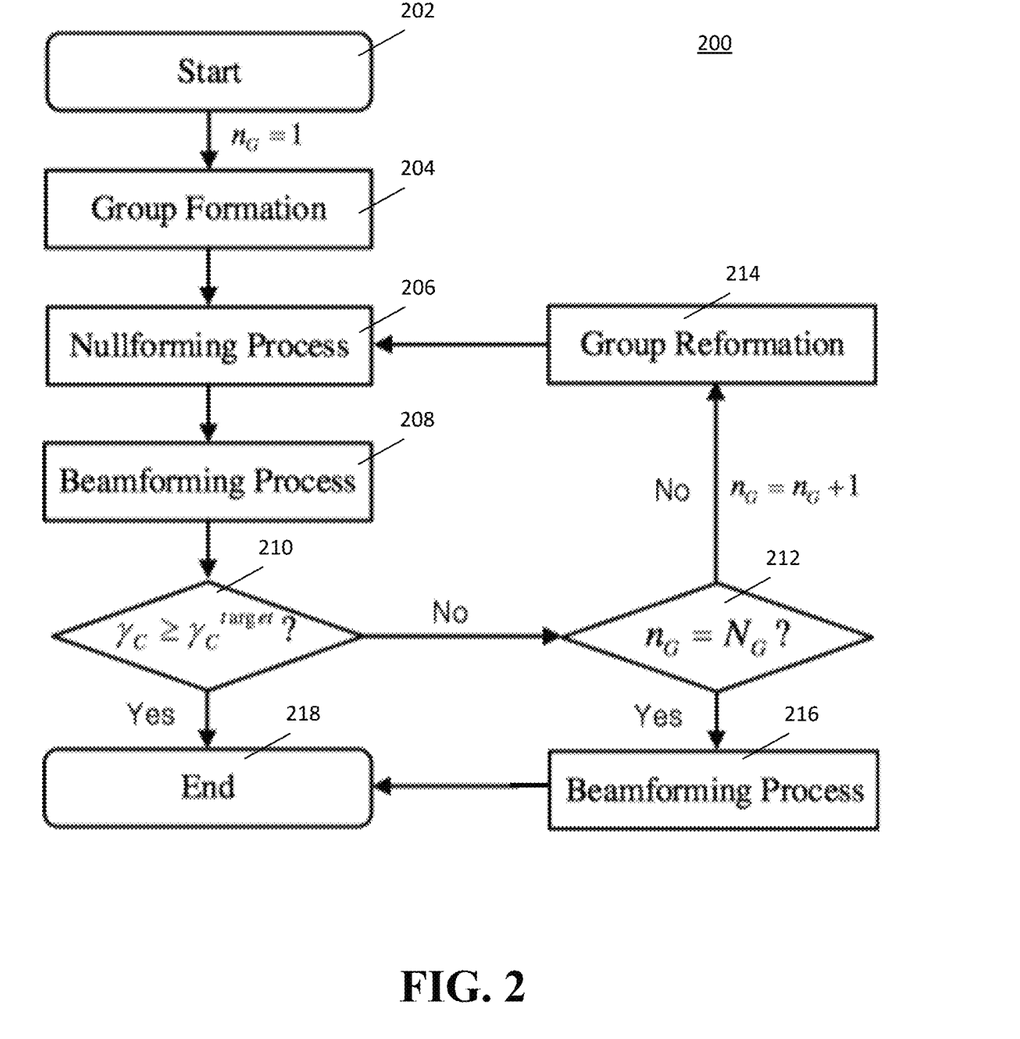
FIG. 2 is a flowchart of a secure communication method for use with the wireless network of FIG. 1 in accordance with at least one embodiment of the invention.

FIG. 2 is a flowchart of a secure communications method 200 for wireless networks (e.g., network 100 of FIG. 1) according to one or more embodiments of the invention. The method 200 begins at 202 and proceeds to 204 wherein the agents are organized into beamforming and nullforming groups. The method 200, at 204, divides the agents into two separate groups where one agent group forms a radiation beam substantially vectored towards the client (i.e., produces a main lobe of a radiation pattern toward the client) and the other agent group broadcasts interference to confuse potential adversaries. In order to reduce the impact of the interference at the client, the nullforming agent group creates a radiation pattern having a null in the interference bearing signal directed toward the client. The focused beamforming for communications and non-focused interference is designed to preventing potential adversaries from eavesdropping.

The basic premise of this methodology is that multiple distributed agents need to adjust the phase components of their broadcasted signals with the aim of fulfilling the QoS requirement of the client without coordination among the agents. The lack of agent coordination, i.e., the agents do not communicate with one another, reduces latency and system overhead. Embodiments of the invention operate in a fully distributed manner with, in one embodiment, only two bits of feedback information from the client being transmitted to the agents and without any knowledge about potential adversaries. As such, the feedback information requires very little overhead in the communication signaling.

More specifically, the processes of beamforming and nullforming relate to controlling aspects of the radio RF signals used by the agents and client. Beamforming is cooperative communication in which distributed agent transmitters in the beamforming group control the phases of their RF signals in a way that the signals are constructively combined at a client. As such, the signal strength at the client from the beamforming agents is maximized. For nullforming, the distributed agent transmitters in the nullforming group control their RF signal phase components in such a way that their signals substantially cancel each other at the client. Hence, they form a null in the direction towards the client. This results in the minimization of the signal strength at the client from the nullforming agents. To further confuse potential adversaries, the "nullforming" agents may broadcast interference signals, e.g., noise or spoofing signals.

The following detailed description of the invention uses various notations and equations to describe the operation of the invention. Table 1 below lists a definition for each of the notations used below.

TABLE 1

LIST OF NOTATIONS

| Notation | Definition |
| --- | --- |
| M | Number of distributed transmitters |
| P | Transmit power at all transmitters |
| $v_i$ | System-induced phase offset at transmitter i |
| $\phi_i(t)$ | Phase component of transmitter i |
| $h_{C,i}$ | Gain of the channel between transmitter i and the client |
| $h_{A,i}$ | Gain of the channel between transmitter i and the adversary |
| $\theta_{C,i}$ | Phase of the channel between transmitter i and the client |
| $\theta_{A,i}$ | Phase of the channel between transmitter i and the adversary |
| G | A set of all transmitters |
| $G_B$ | Set of beamforming transmitters |
| $G_N$ | Set of nullforming transmitters |
| $\gamma_C(\gamma_A)$ | SINR at the client (adversary) |
| $\sigma_C^2 (\sigma_A^2)$ | Power of AWGN at the client (adversary) |
| $\epsilon_C$ | INR at the client |
| $\gamma_C^{target}$ | Target SINR |

TABLE 1-continued

LIST OF NOTATIONS

| Notation | Definition |
|---|---|
| $\varepsilon_C^{target}$ | Target INR |
| $p_N$ | Probability of choosing the nullforming mode |
| F | Two bits of feedback information |
| Δ | Magnitude of phase perturbation |
| $N_G$ | Maximum number of allowed group formations |
| $N_N$ | Parameter for the stopping criteria in Pseudocode 2 |
| $N_B$ | Parameter for the stopping criteria in Pseudocode 3 |
| $N_S$ | Number of candidates for the phase rotation in Pseudocode 4 |
| $N_B$ | Parameter for the stopping criteria in Pseudocode 4 |
| Λ | Parameter for the phase rotation in Pseudocode 4 |

The signal processing used to implement the method 200 is described in further detail below. In addition, the following is a pseudocode representation (Pseudocode 1) of the method 200:

1. Initialize t = 1, $n_G$ = 1, $\phi_i(0)$ = 0 for ∀i.
2. Transmitter i generates a random number $\eta_i$ following the distribution $\mathcal{U}$ for ∀i.
3. If $\eta_i \leq p_N$, i ∈ $\mathcal{G}_N^{(n_G)}$ and otherwise i ∈ $\mathcal{G}_B^{(n_G)}$ for ∀i.
4. Nullforming
   a. Perform the nullforming algorithm Null($\mathcal{G}_B^{(n_G)}$, $\mathcal{G}_N^{(n_G)}$, $N_N$) in Pseudocode 2
   b. If $\mathcal{F}$ = (1,0) and $n_G$ = 1, go to Step 2.
   c. If $\mathcal{F}$ = (1,0) and $n_G$ > 1, go to Step 7-a.
   d. If $\mathcal{F}$ = (1,1) go to Step 5.
5. Beamforming
   a. Perform the beamforming algorithm Beam($\mathcal{G}_B^{(n_G)}$, $\mathcal{G}_N^{(n_G)}$, $\gamma_C^{target}$, $N_B$) in Pseudocode 3
   b. If $\mathcal{F}$ = (1,0) and $n_G$ = 1, go to Step 2.
   c. If $\mathcal{F}$ = (1,0) and $n_G$ > 1, go to Step 7-a.
   d. If $\mathcal{F}$ = (1,1) go to Step 6.
6. Evaluation
   a. If $\gamma_C(t) \geq \gamma_C^{target}$, the client feeds back $\mathcal{F}$ = (1,1), and otherwise $\mathcal{F}$ = (1,0).
   b. If $\mathcal{F}$ = (1,1), go to Step 7-b.
   c. If $\mathcal{F}$ = (1,0) and $n_G$ < $N_G$, update $n_G = n_G + 1$ and go to Step 7-a.
   d. If $\mathcal{F}$ = (1,0) and $n_G$ = $N_G$, perform the beamforming algorithm Beam($\mathcal{G}$, ∅, ∞, $N_B$) in Pseudocode 3 Go to Step 7-b.
7. Decision
   a. For ∀i ∈ $\mathcal{G}_N^{(n_G-1)}$, transmitter i generates a random number $\eta_i$ following the distribution $\mathcal{U}$. If $\eta_i \leq p_N$, i ∈ $\mathcal{G}_N^{(n_G)}$ and otherwise i ∈ $\hat{\mathcal{G}}_B^{(n_G)}$. Set $\tilde{\mathcal{G}}_B^{(n_G)} = \mathcal{G}_B^{(n_G-1)}$ and $\mathcal{G}_B^{(n_G)} = \hat{\mathcal{G}}_B^{(n_G)} \cup \tilde{\mathcal{G}}_B^{(n_G)}$ and go to Step 4.
   b. All transmitters keep using the obtained {$\phi_i(t)$} for their transmission.

Denoting the transmit signal at agent i in time t by $x_i(t)$, the received signal at the client from agent i is given by:

$$r_{C,i}(t) = h_{C,i} e^{j\theta_{C,i}} x_i(t), \quad (1)$$

where $h_{C,i}$ and $\theta_{C,i}$ respectively denote the gain and phase of the channel between agent i and the client. Also, the received signal at a potential adversary from agent i in time t is expressed as:

$$r_{A,i}(t) = h_{A,i} e^{j\theta_{A,i}} x_i(t), \quad (2)$$

where $h_{A,i}$ and $\theta_{A,i}$ represent the gain and phase of the channel between agent i and the adversary, respectively.

The transmit signal at agent i in time t is given by:

$$x_i(t) = \sqrt{P} e^{j\phi_i(t)} s_i(t), \quad (3)$$

where P is the transmit power at all agents, $\phi_i(t)$ stands for the phase component controlled by agent i in time t and $s_i(t)$ is the transmit data at agent i. The method 200 denotes G to be the set of all agents. The method 200, at 204, divides the agents into two separate groups, $G_B$ and $G_N$, where $G = G_B \cup G_N$. The agents in $G_B$ are the beamforming group and send a confidential message $s_C$ to the client.

On the other hand, the agents in $G_N$ compose the nullforming group and they may broadcast artificial interference $s_N$ with the aim of confusing the adversary. Therefore, $s_i(t) = s_C$ for agent i ∈ $G_B$, and $s_i(t) = s_N$ for i ∈ $G_N$. Here, $|s_C|^2 = 1$ and $|s_N|^2 = 1$. To alleviate the influence of the artificial interference on the client, the agents in $G_N$ steer their phase components in such a way that their signals substantially cancel each other at the client (nullforming). Some embodiments of the invention may randomly generate and transmit artificial noise. As an example, $s_N$ can be obtained by generating a random value $\tilde{s}_N$ following complex Gaussian distribution and setting $s_N = \tilde{s}_N / |\tilde{s}_N|$.

Based on the foregoing, the signal-to-noise-plus-interference ratio (SINK) at the client is expressed as:

$$\gamma_C(t) = \frac{\left|\sum_{i \in G_B} \sqrt{P} h_{C,i} e^{j(\theta_{C,i} + \phi_i(t))}\right|^2}{\left|\sum_{i \in G_N} \sqrt{P} h_{C,i} e^{j(\theta_{C,i} + \phi_i(t))}\right|^2 + \sigma_C^2}, \quad (4)$$

where $\sigma_C^2$ stands for the variance of additive white Gaussian noise (AWGN) at the client. When the nullforming agents radiate interference, the client measures the interference-to-noise ratio (INR) which is defined by:

$$INR(t) = \frac{\left|\sum_{i \in G_N} \sqrt{P} h_{C,i} e^{j(\theta_{C,i} + \phi_i(t))}\right|^2}{\sigma_C^2}. \quad (5)$$

Similarly, the SINR at the adversary is given by:

$$\gamma_A(t) = \frac{\left|\sum_{i \in G_B} \sqrt{P} h_{A,i} e^{j(\theta_{A,i} + \phi_i(t))}\right|^2}{\left|\sum_{i \in G_N} \sqrt{P} h_{A,i} e^{j(\theta_{A,i} + \phi_i(t))}\right|^2 + \sigma_A^2}, \quad (6)$$

where $\sigma_A^2$ is the AWGN variance at the adversary.

The goal of the technique is to form agent groups $G_B$ and $G_N$ and identify phase components $\phi_1(t), \ldots \phi_M(t)$ which satisfy the QoS constraint of the client ($\gamma_C(t) \geq \gamma_C^{target}$) while preventing the adversary from intercepting the confidential message where $\gamma_C^{target}$ is a target SINR. It is assumed that all agents do not know their communication channels to the client $$(\{h_{C,i}\}_{i=1,\ldots,M} \text{ and } \{\theta_{C,i}\}_{i=1,\ldots,M})$$

and the adversary $$(\{h_{A,i}\}_{i=1,\ldots,M} \text{ and } \{\theta_{A,i}\}_{i=1,\ldots,M}).$$

In some embodiments, agents may randomly select their transmission modes. At the beginning of a transmission stage, each agent independently chooses the nullforming mode with probability $p_N$ or the beamforming mode with probability $1-p_N$. This selection may be made randomly. For example, each agent may have their own randomizer or number generator (algorithm) used to select one mode or the other. While independent of one another, the agents may execute their randomizer generator at pre-determined time intervals.

Once the agents are grouped, the beamforming agents in $G_B$ remain silent and, at 206, the nullforming agents in $G_N$ adjust their phases to minimize the strength of the received signal at the client. The phase components at the nullforming agents are determined so that the interference term in $\gamma_C(t)$ is minimized, and hence the impact of the signals from $G_N$ on $\gamma_C(t)$ is marginal. On the other hand, the signals may have a significant influence on the SINR at the adversary $\gamma_A(t)$ as they might be combined constructively at the adversary.

The following is pseudocode representing (Pseudocode 2) one embodiment of a process that may be used in nullforming.

1. Initialize $\phi_i(t-1) = 0$ for $\forall i \in \mathcal{G}_N$, $\xi_C^* = \infty$, and $n_N = 0$.
2. Transmitters in $\mathcal{G}_B$ keep silent.
3. For $\forall i \in \mathcal{G}_N$, $\phi_i(t) = \phi_i(t-1) + \delta_i$ where $\delta_i$ is uniformly distributed on $[0, \Delta]$ and transmitters in $\mathcal{G}_N$ transmit signals to the client using $\{\phi_i(t)\}$.
4. Feedback
   a. The client measures $\xi_C(t)$ in equation (7).
   b. If $\xi_C(t) = 0$, the client feeds back $\mathcal{F} = (1,0)$.
   c. If $\xi_C(t) \leq {}^{target}$ or $n_N = N_N$, the client feeds back $\mathcal{F} = (1,1)$.
   d. If $\xi_C(t) < \xi_C^*$, the client feeds back $\mathcal{F} = (0,0)$ and updates $\xi_C^* = \xi_C(t)$.
   e. If $\xi_C(t) \geq \xi_C^*$, the client feeds back $\mathcal{F} = (0,1)$.
5. Update
   a. If $\mathcal{F} = (1,1)$, transmitters in $\mathcal{G}_N$ keep using $\{\phi_i(t)\}$ for their transmission. Set $t = t + 1$.
   b. If $\mathcal{F} = (0,0)$, transmitter i keeps $\phi_i(t)$ for $\forall i \in \mathcal{G}_N$. Set $n_N = 0$ and $t = t + 1$, and go to Step 3.
   c. If $\mathcal{F} = (0,1)$, transmitter i sets $\phi_i(t) = \phi_i(t-1)$ for $\forall i \in \mathcal{G}_N$. Set $n_N = n_N+1$, $t = t+1$, and go to Step 3.

Figure 3:
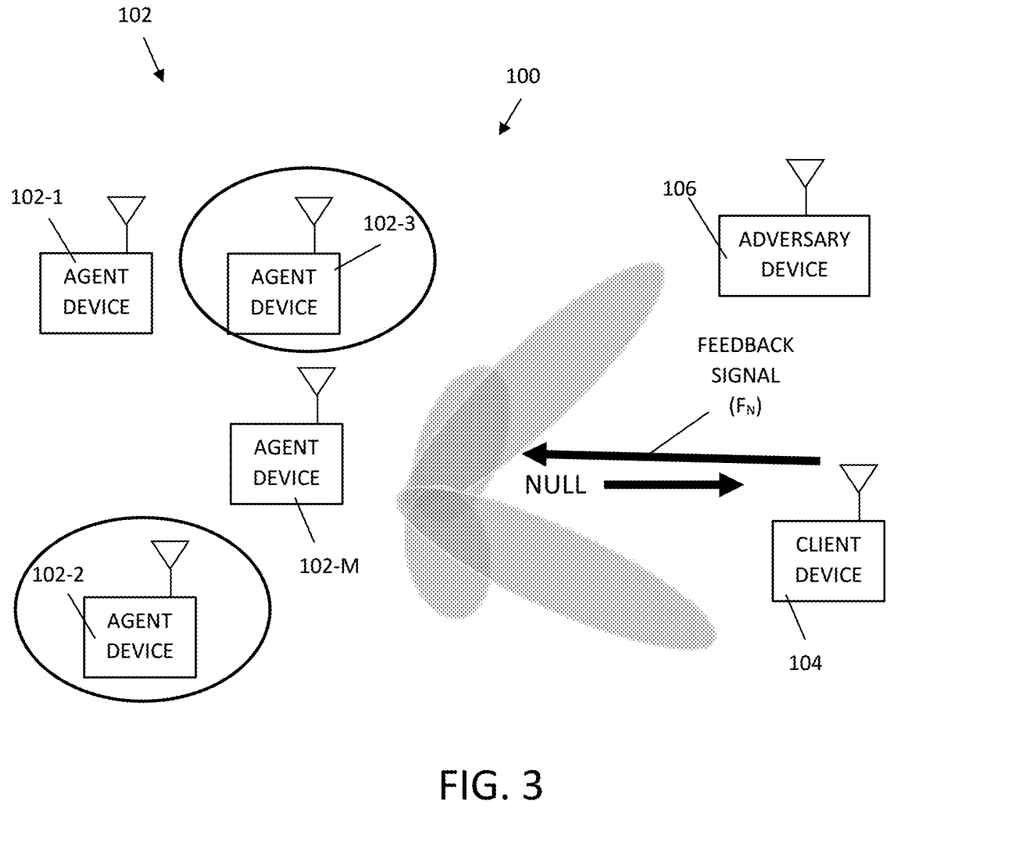
FIG. 3 depicts a block diagram of the network of FIG. 1 forming a null in the direction of the client in accordance with at least one embodiment.

FIG. 3 depicts a block diagram of the network 100 of FIG. 1 forming a null in the direction of the client 104 using agent devices 102-2 and 102-3 (circled) in the nullforming process in accordance with at least one embodiment. Agent devices 102-1 and 102-M are idle during the nullforming process. As noted in Pseudocode 2, the client measures the received signal plus noise and transmits a feedback signal F to the agents such that the nullforming agents adjust their RF signal phase until the feedback indicates an acceptable level of noise signal is received, i.e., a minimal level of noise indicating the null is aligned with the client.

In FIG. 2, when the nullforming process is complete, then at 208, the beamforming agents in $G_B$ update their phases with the goal of forming a beam that maximizes the SINR $\gamma_C(t)$. The following is a pseudocode representation (Pseudocode 3) of one embodiment of a process used in beamforming.

1. Initialize $\phi_i(t) = 0$ for $\forall i \in \mathcal{G}_B$, $\gamma_C^* = 0$ and $n_B = 0$.
2. For $\forall i \in \mathcal{G}_B$, $\phi_i(t) = \phi_i(t-1) + \delta_i$ where $\delta_i$ is uniformly distributed on $[0, \Delta]$.
3. Transmitters in $\mathcal{G}$ send their signals using $\{\phi_i(t)\}$.
4. Feedback
   a. The client measures $\gamma_C(t)$ in equation (5).
   b. If $\gamma_C(t) = 0$, the client feeds back $\mathcal{F} = (1,0)$.
   c. If $\gamma_C(t) \geq \gamma_C^{target}$ or $n_B = N_B$, the client feeds back $\mathcal{F} = (1,1)$.
   d. If $\gamma_C(t) > \gamma_C^*$ the client feeds back $\mathcal{F} = (0,0)$ and updates $\gamma_C^* = \gamma C(t)$.
   e. If $\gamma C(t) \leq \gamma C^*$, the client feeds back $\mathcal{F} = (0, 1)$.
5. Update
   a. If $\mathcal{F} = (1,1)$, transmitters in $\mathcal{G}_B$ keep using $\{\phi_i(t)\}$ for their transmission. Set $t = t + 1$.
   b. If $\mathcal{F} = (0,0)$, transmitter i keeps $\phi_i(t)$ for $\forall i \in \mathcal{G}_B$. Set $n_B = 0$ and $t = t + 1$, and go to Step 2.
   c. If $\mathcal{F} = (0,1)$, transmitter i sets $\phi_i(t) = \phi_i(t-1)$ for $\forall i \in \mathcal{G}_B$. Set $n_B = n_B+1$, $t = t+1$, and go to Step 2.

Figure 4:
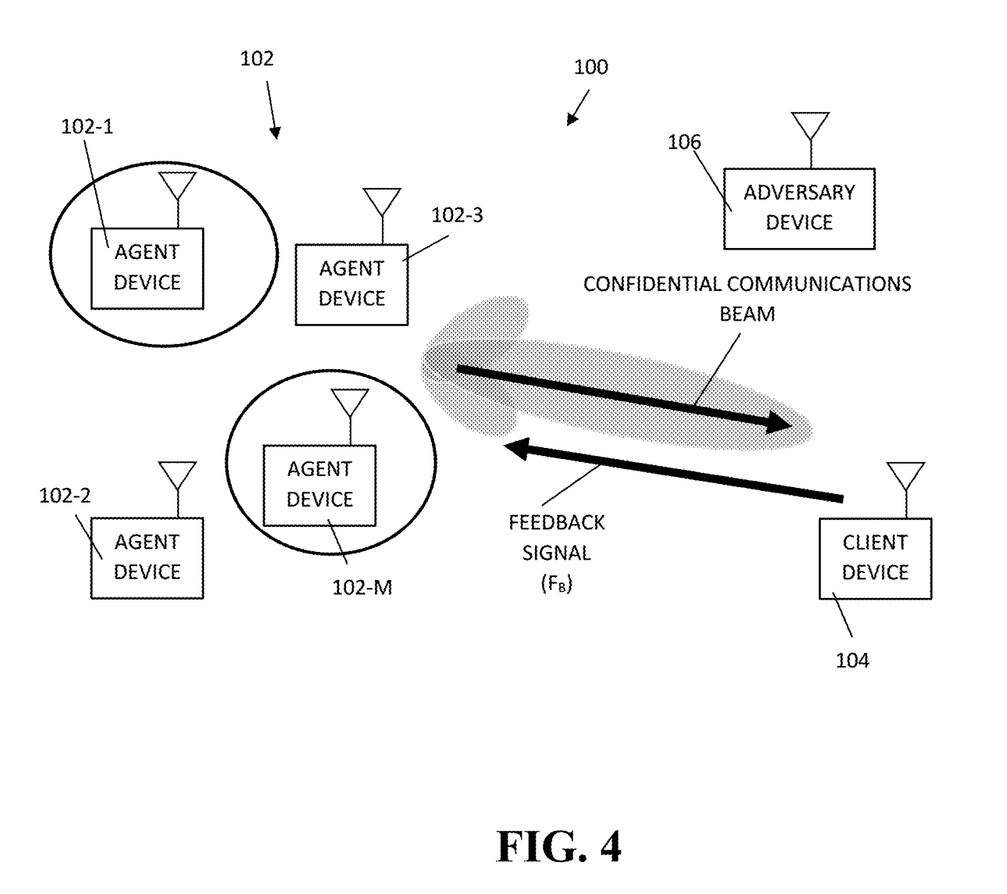
FIG. 4 depicts a block diagram of the network of FIG. 1 forming a communications signal beam in the direction of the client in accordance with at least one embodiment.

FIG. 4 depicts a block diagram of the network 100 of FIG. 1 forming a communications beam in the direction of the client 104 using agent devices 102-1 and 102-M (circled) in the beamforming process in accordance with at least one embodiment. Agent devices 102-2 and 102-3 transmit the nullformed interference signal during the beamforming process. As with the beamforming process and as noted in Pseudocode 3, the client transmits a feedback signal F to inform the agents when an acceptable signal strength is being received. Until the received signal is acceptable, the agents periodically adjust the phase of the transmitted RF signal.

In FIG. 2, the beamforming process at 208 ends when the client sends back (1,1) as in Step 4-c of Pseudocode 3 above. Right after sending (1,1), the client sends one of (1,1) or (1,0) as in Step 6 in Pseudocode 1 above. The information (1,0) indicates that the resultant SINR is not sufficient. Since the nullforming agents know the current value of $n_G$, the nullforming agents perform a new group formation when they receive (1,0) and $n_G < N_G$ as in Step 6-d in Pseudocode 1. As such, each agent may include a clock to maintain relative time for signaling and periodically adjusting the phase of the RF signal.

Since the transmission mode selection is performed in a random fashion, there exists a probability of having a small number of beamforming agents. In this case, as mentioned above, the resultant SINR can be smaller than the target SINR. To handle this potential outcome of random agent mode assignment, at 210, the method 200 queries whether the target SINR is not attained. If the target SINR is not attained, the method 200 proceeds to 212 in order to increase the number of beamforming agents and enhance the SINR at the client. At 214, each member of the nullforming agent group perform a process where they select to stay in the nullforming mode or switch to the beamforming mode. They do this by randomly selecting their modes, i.e., nullforming with probability $p_N$ and beamforming mode with probability $1-p_N$. Then, at 206 and 208, the nullforming and beamforming processes are conducted with reformed groups $G_B$ and $G_N$. At 210, 212 and 214, this reformation of groups $G_B$ and $G_N$ is repeated until the target SINR $\gamma_C^{target}$ is achieved. If $\gamma_C^{target}$ is too high to be achieved with the nullforming agents, the number of group formations $n_G$ can be large which incurs high latency. Thus, in order to tackle this issue, all agents perform beamforming when $n_G$ becomes identical to a predefined number $N_G$ (such as 10 for instance) and the query at 212 is positively answered. At this point, the method 200 proceeds to 216 to perform the beamforming process using all agents. The method 200 ends at 218.

The secure communications method 200 ends when $\gamma_C \geq \gamma_C^{target}$ (at 210) or $n_G = N_G$ and a final beamforming is performed (at 212 and 216).

In theory, randomizing should be somewhat close to a 50/50 split among agents in the two groups (the number of nullforming and beamforming transmitters highly depend on the required QoS). For example, if $\gamma_C^{target}$ is very high, the number of beamforming transmitters will necessarily be much larger than that of nullforming transmitters. But, this may not necessarily occur for every transmission time period, i.e., a time slot. In any event, with an effective randomizer or number generator, over time using the above iterative process, there should be close to a 50/50 split created over many time slots.

As further described below, the nullforming and beamforming processes are performed in alternating time periods (time slots) and are iterative in nature. The specific feedback from the client to an agent, labelled $F_N$ (nullforming feedback) in FIG. 3 and $F_B$ (beamforming feedback) in FIG. 4, includes 2 bits of feedback data. A message may be sent from the client and received by one or more agents at each iteration. These processes are repeated until the QoS constraint of the client is satisfied or a predetermined number of iterations is achieved.

The feedback F is different for nullforming and beamforming sub-processes. $F_N$ and $F_B$ are sets containing four predetermined, two-bit informational messages, respectively, which may be used for feedback for nullforming and beamforming, respectively. The message from the client to the agent including feedback F may have two values, e.g., (0,0), (0,1), (1,0) and (1,1). Each value may be a binary value, 0 or 1, corresponding to a parameter. Hence, the feedback F in the message is formed of two bits. It is noted that there is no specific meaning on the first and second numbers in each parenthesis of the parameters or the number of parameters in a given set. Embodiments use (0,0), (0,1), (1,0) and (1,1) as to represent examples of values for the four two-bits messages which may be included in feedback sets $F_N$ and $F_B$. Alternatively, embodiments could use other values and parameters as well as other items to represent data.

In the exemplary set of feedback $F_N$ for the nullforming process, (0,0) and (0,1), respectively, indicate that the current INR is smaller and larger than the saved lowest INR. The information (1,0) indicates the case INR=0 which indicates that the number of nullforming transmitters is zero. (1,1) is used to notify that the nullforming process is complete. In the set of feedback $F_B$ for the beamforming process in the breakout (0,0) and (0,1), respectively, indicate that the current SINR is larger and smaller than the saved highest SINR. The information (1,0) indicates the case SINR=0 which indicates that the number of beamforming transmitters is zero, i.e., no signal is being transmitted or received. (1,1) is used to notify that the beamforming process is complete. Again, just one two-bit parameter of either set $F_N$ or $F_B$ will be include in the feedback F in any one feedback communication from the client to the agent(s).

The client sends the feedback F wirelessly to an agent in a communication message including one of the four possible two-bit parameters from set $F_N$ or set $F_B$. Upon receipt of the feedback communication from the client, the agent acts accordingly based on the predetermined two-bit data included in feedback F of that communication.

Nullforming and beamforming are iterative processes that occur at each time slot. The agent updates its phase components in response to the two bits of information received from the client based on the feedback F for nullforming and beamforming. In time slot t, the phases of the nullforming and beamforming agents are adjusted by: $\phi_i(t) \leftarrow \phi_i(t-1) + \delta_i$, where $\delta_i$ is uniformly distributed on $[0, \Delta]$. For instance, $\Delta$ may be $$\frac{\pi}{5}$$

in one non-limiting example.

For nullforming sub-processing, the agent considers the Interference-to-noise ratio (INR) at each iteration, and the iteration stops if INR(t)≤INR$^{target}$ or the number of iterations reaches $N_N$. In one non-limiting example, $N_N$ may be 50. INR$^{target}$ may be 0.001, for instance. INR* represents the saved lowest computed INR thus far. For the beamforming sub-processing, the iteration stops if $\gamma_C(t) \geq \gamma_C^{target}$ or the number of iterations reaches $N_B$. $\gamma_C^*$ represents the saved highest computed SINR thus far. In one non-limiting example, $N_B$ may be 50.

The process above may be performed utilizing as few as two agents (M=2). When there are two agents, there are three cases that may arise:

1) Two agents select the beamforming mode and adjust their phases to form a beam to the client.
2) Only one agent selects the beamforming mode, then all agents do not need to adjust their phases since beamforming or nullforming cannot be performed. If the resultant SINR at the client is sufficient, a group reformation is not required. If SINR is not sufficient, a group reformation is conducted.
3) Two agents select the nullforming mode. In this case, a group reformation will be conducted to enhance SINR.

Figure 5:
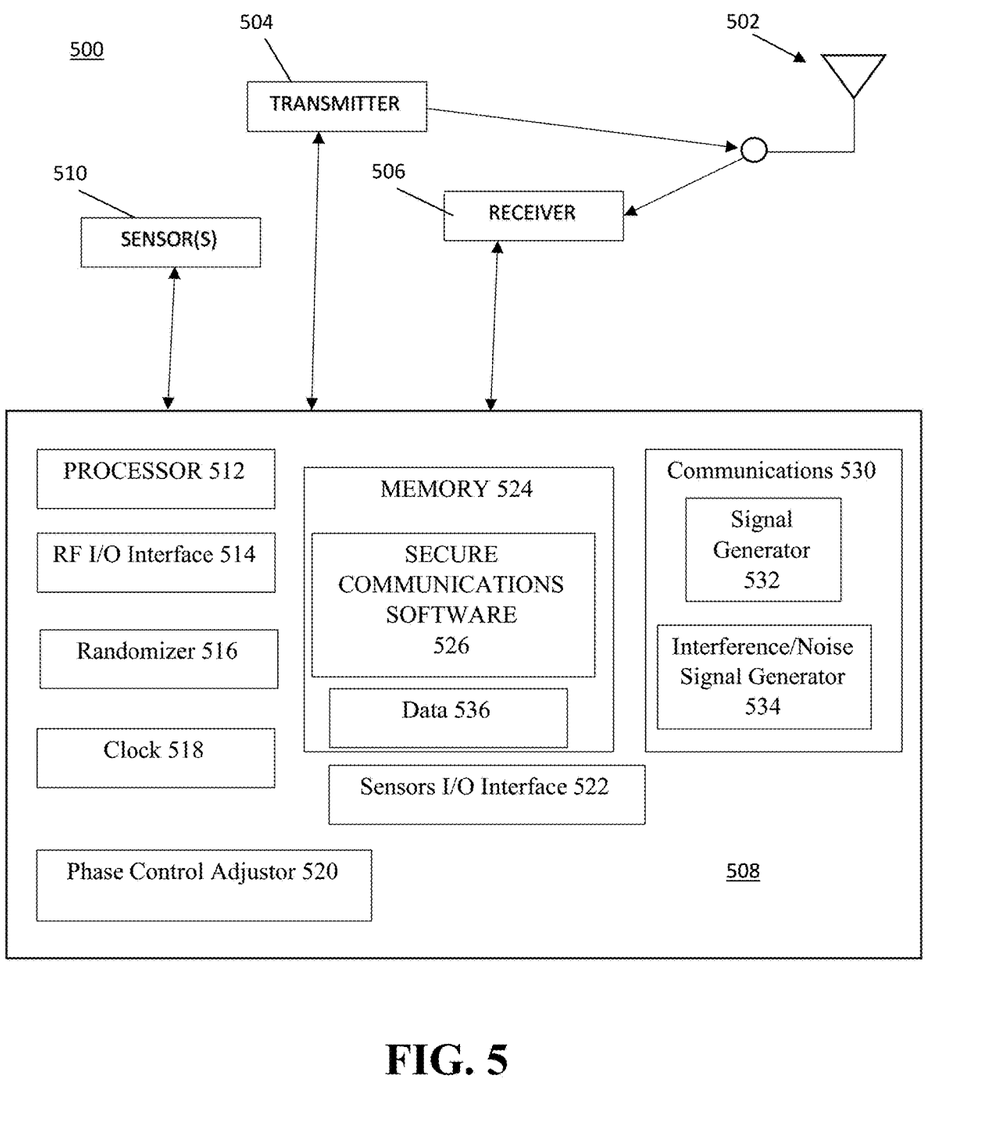
FIG. 5 depicts a simplified high-level block diagram of an exemplary transceiver for an agent or a client in accordance with at least one embodiment.

FIG. 5 depicts a simplified high-level block diagram of an exemplary transceiver 500 for an agent (102 in FIGS. 1, 3 and 4) in accordance with at least one embodiment. In some embodiments, the client (104 in FIGS. 1, 3, and 4) may also include this form of transceiver. The transceiver 500 comprises an antenna 502, an RF transmitter 504, an RF receiver 506, a controller 508 and, optionally, one or more sensors 510. In one embodiment, the transceiver 500 may be specifically configured to execute Secure communications software 526 comprising the pseudocode (Pseudocode 1, 2, and 3) to perform the method 200 of FIG. 2 as described above.

In one embodiment, the transmitter 504 is a conventional RF transmitter that is controlled by the controller 508 such that the transmitter shall transmit a data carrying communication signal when the transceiver is used as a beamforming agent or transmit noise or interference signals when the transceiver is used as a nullforming agent. The transmitter 504 is capable of having the phase of the transmitted signal adjusted by the controller 508 such that the beam and/or null may be appropriately directed. When transceiver 500 is used as a portion of a client device, the transmitter 504 transmits data including the feedback bits F.

In one embodiment, the receiver 506 is a conventional RF receiver that is controlled by the controller 508. When operating as an agent, the receiver 506 receives communications signals from a client including the feedback bits F and couples the data and feedback bits to the controller for processing. When the transceiver 500 is a portion of a client, the receiver 506 receives the signals from the agents to facilitate forming a null or beam as described above.

The optional sensors 510 may include one or more of cameras, microphones, multispectral imaging (UV/visible/IR) sensors; antennas (RF; radio); ranging (radar; LIDAR)

sensors; location/position sensors (GPS, altitude/depth, etc.), motion sensors (speed/velocity, bearing/trajectory, acceleration, etc.); weather sensors (temperature, pressure, wind speed, ambient lighting, etc.); field sensors (electric, magnetic, vibrations, radiation, biological, etc.) and the like. The signals to/from these sensors 510 are processed by the controller 508 and may be used locally or transmitted to the client from an agent or to an agent from a client.

In one embodiment, the controller 508 comprises a processor 512, memory 524 and various support sub-systems and circuits such as, but not limited to, an RF input/output (I/O) interface 514, a randomizer 516, a clock 518, a phase control adjustor 520, a sensor(s) I/O interface 522, and a communications module 530. The RF input/output (I/O) interface 514 communicates with the RF hardware (e.g., receiver 506 and transmitter 504) so as to control the transmission/receptions of radio signals for communications and beamforming. It includes frequency synchronization configured to carry out the adaptive beamforming and nullforming methodology including handling both the transmission and feedback signals in a manner to support the processing discussed above. The sensor(s) I/O interface 522 communicates with any sensor(s) which the agent or client may be equipped. The randomizer 516 generates random values that are used for determining whether to be grouped as a beamforming or nullforming agent. This may be a conventional randomizer or number generator processor, which is configured to return a binary value (e.g., 0 or 1). One value can be associated with beamforming and the other value can be associated with nullforming. The clock 518 is used for timing and establishing time slots to facilitate alternating and iterative utilization of beamforming and nullforming processes. In one embodiment, the clock of each agent may be calibrated ahead of time such that all agents' clocks are substantially correlated. The clocks may also be synchronized to an external source such a satellite navigation system (e.g., the global Positioning System (GPS)). In other embodiments, an agent could interface with the client (or another entity) for clock calibration. The communications module 530 generate signals for communications, including a RF communications signal generator 532 and an RF interference/noise generator 534 to be used for beamforming or nullforming, respectively. The module 530 may be capable of handling analog or digital signals, the later including packetized data. If desired, the signal generator 532 may provide encryption for provided confidential signals as known in the art.

In one embodiment, the controller 508 includes a processor 512 coupled to a memory 524. The processor 512 may be one or more of, or combinations thereof, microprocessors, microcontrollers, application specific integrated circuits (ASICs), and/or the like. The memory 524 may be any form of read only memory, random access memory or combinations thereof. In an embodiment, the memory 524 is a non-transitory computer readable media that stores secure communications software 526 and data 536 such that the processor 512 may execute the software 526 to implement the method 200 of FIG. 2 to perform beamforming and nullforming in accordance with embodiments of the invention described above. Portions of the method 200 are appropriately performed by a controller 508 in the client and agent as described above. The data 536 may include communications data, control data and feedback data.

From numerical simulations, embodiments of the beamforming/nullforming methodology substantially improves secure communications between agents and clients as well as suppresses the ability of adversaries to intercept the communications signals. In one example, when the client SINR is equal to 24 dB, the SINR at an adversary may be decreased by 10 dB when compared to the conventional methodology that does not consider the presence of potential adversaries.

The aforementioned technology can be utilized for wireless networks where multiple geometrically distributed transmitters send a confidential message to an intended receiver. More specifically, the technology is suitable for any network where there are security threats, coordination among the transmitters is restricted or feedback from the client receiver is limited.

Also, the distributed beamforming methodology can be applied to networks with autonomous mobile agents that coordinate antenna element radiation to establish a communication link to a client, e.g., soldier, first responder or another autonomous agent. It may be implemented in environments such as underground tunnels and dense forests are austere, highly dynamic and infrastructure-poor, e.g., Global Positioning System (GPS)-denied and limited finite-rate feedback information from the client. In addition, the distributed beamforming techniques should provide security to prevent malicious eavesdroppers from intercepting confidential messages in the battlefield or wireless commercial networks. The technology proposes a beamforming technique that establishes a secure communication link between the agents and client with a low feedback burden (for example, two bits) and without any required information about potential malicious adversaries.

Potential commercial uses of embodiments of the invention include data transmission in wireless sensor networks where multiple distributed sensor nodes send collected data to a gateway. By using the technology, geometrically separated sensor nodes can securely transmit confidential messages to the gateway based on, for example, two bits of feedback information from the gateway without coordination among the sensor nodes. The technology is scalable in terms of the number of transmitters (sensors), and hence it can be applied to the networks with a large number of sensors.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e. within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g. A, AB, AC, ABC, ABB, etc.). When "and/or" is used, it should be understood that the elements may be joined in the alternative or conjunctive.

The invention claimed is:

1. A system for distributed wireless communications comprising:
    a first group of agents selected and configured to wirelessly transmit a communication signal to a client, wherein the first group of agents is capable of forming a radiation beam carrying the communication signal vectored substantially toward the client; and
    a second group of agents selected and configured to wirelessly broadcast communication signal interference, wherein the second group of agents is capable of forming a radiation pattern having null vectored substantially toward the client.

2. The system of claim 1, wherein a number of agents in the first group and the second group are adjusted to satisfy a quality of service (QoS) constraint of the client.

3. The system of claim 1, wherein each agent of the first group controls a phase of the transmitted communication resulting in the communication signals transmitted by each agent in the first group of agents constructively combining at the client.

4. The system of claim 1, wherein each agent of the second controls a phase of the transmitted communication signal interference resulting in the communication signal interference transmitted by each agent in the second group of agents cancelling each other at the client.

5. The system of claim 1, further comprising the client.

6. The system of claim 1 wherein the first group and second group are formed through random selection.

7. The system of claim 6 wherein the first group and second group are reformed when a quality of service (QoS) constraint is not fulfilled at the client.

8. A method for performing distributed wireless communications comprising:
    dividing a plurality of agents into a first group and a second group;
    configuring the first group to wirelessly transmit a communication signal to a client, wherein the first group is capable of forming a radiation beam carrying the communication signal vectored substantially toward the client; and
    configuring the second group to wirelessly broadcast communication signal interference, wherein the second group is capable of forming a radiation pattern having a null vectored substantially toward the client.

9. The method of claim 8, further comprising adjusting the plurality of agents comprising the first group and the second group to satisfy a quality of service (QoS) constraint of the client.

10. The method of claim 8, wherein, for each agent of the first group, controlling a phase of the transmitted communication signal resulting in the communication signal transmitted by each agent in the first group constructively combining at the client.

11. The method of claim 8, wherein, for each agent of the second group, controlling a phase of the transmitted communication signal interference resulting in the communication signal interference transmitted by each of the agents in the second group cancelling each other at the client.

12. The method of claim 8, wherein the communication signal interference comprises randomly generating artificial noise.

13. The method of claim 8, wherein dividing the agents into the first group and the second group further comprises randomly dividing the plurality of agents into the first and second groups.

14. The method of claim 13, wherein each agent in the plurality of agents makes a random determination for whether that agent will be part of the first group or the second group.

15. The method of claim 8, further comprising receiving at least one agent a client communication signal transmitted from the client comprising feedback information based on received signal to interference plus noise ratio (SINK) or interference to noise (INR).

16. The method of claim 15, wherein the feedback information comprises two bits.

17. The method of claim 16, further comprising adjusting the phase of the transmitted communications signal or communication signal interreference in response to the two bits of feedback information.

18. The method of claim 17, further comprising repeating the adjusting until a QoS constraint of the client is satisfied or achieving a predetermined number of adjusting iterations.

19. The method of claim 8, wherein none of the plurality of agents transmit information about potential malicious adversaries to the client and/or another agent.

20. A system for distributed wireless communications comprising:
    a plurality of agents randomly divided into a first group of agents and a second group of agents;
    a client configured to receive a communication signal transmitted by at least one of the plurality of agents;
    the first group of agents are configured to wirelessly transmit the communication signal to the client, wherein the first group of agents is capable of forming a radiation beam carrying the communication signal vectored substantially toward the client;
    the second group of agents are configured to wirelessly broadcast communication signal interference, wherein the second group of agents is capable of forming a radiation pattern having a null vectored substantially toward the client; and
    wherein a number of agents in the first group and the second group are adjusted to satisfy a quality of service (QoS) constraint of the client.

* * * * *